US009047715B2

(12) United States Patent
Amron

(10) Patent No.: US 9,047,715 B2

(45) Date of Patent: Jun. 2, 2015

(54) SYSTEM AND METHOD FOR CREDENTIAL MANAGEMENT AND ADMINISTRATION

(75) Inventor: Alan Amron, Boca Raton, FL (US)

(73) Assignee: eCREDENTIALS, INC., Hempstead, NY (US)

( * ) Notice: Subject to any disclaimer, the term of this patent is extended or adjusted under 35 U.S.C. 154(b) by 0 days.

(21) Appl. No.: 13/311,548

(22) Filed: Dec. 6, 2011

(65) Prior Publication Data

US 2014/0055231 A1 Feb. 27, 2014

Related U.S. Application Data

(63) Continuation-in-part of application No. 13/196,342, filed on Aug. 2, 2011.

(51) Int. Cl.
*G05B 23/00* (2006.01)
*G07C 9/00* (2006.01)

(52) U.S. Cl.
CPC ........ *G07C 9/00119* (2013.01); *G07C 9/00103* (2013.01)

(58) Field of Classification Search
CPC .............................. G06Q 30/02; G07F 7/1008
USPC .......................... 340/10.1, 5.6, 12.5; 235/375
See application file for complete search history.

(56) References Cited

U.S. PATENT DOCUMENTS

| | | | | |
|---|---|---|---|---|
| 6,736,322 | B2 * | 5/2004 | Gobburu et al. | 235/462.46 |
| 7,044,362 | B2 * | 5/2006 | Yu | 235/375 |
| 7,437,755 | B2 * | 10/2008 | Farino et al. | 726/5 |
| 7,828,220 | B2 * | 11/2010 | Mullen | 235/492 |
| 8,267,314 | B2 * | 9/2012 | Ishibashi et al. | 235/380 |
| 8,628,019 | B2 * | 1/2014 | Audebert et al. | 235/492 |
| 2006/0106537 | A1 * | 5/2006 | Hamrick et al. | 701/213 |
| 2009/0172035 | A1 * | 7/2009 | Lessing et al. | 707/104.1 |
| 2010/0014277 | A1 * | 1/2010 | Delany | 362/95 |
| 2010/0238033 | A1 * | 9/2010 | Blumel et al. | 340/573.4 |
| 2012/0072249 | A1 * | 3/2012 | Weir et al. | 705/5 |

* cited by examiner

*Primary Examiner* — Vernal Brown

(74) *Attorney, Agent, or Firm* — Cozen O'Connor

(57) ABSTRACT

A credential management and administration system and method by which the documented eligibility of persons to receive benefits, services, access to premises or events, and the like is centrally administered. In one embodiment, credentials are distributed to the individuals electronically, via communication network, to respective portable device having a corresponding display. Each display is configured to visually present certain qualifying information that is updated at periodic intervals. Alternatively, the qualifying information may be presented via wireless means to a suitable receiver proximate the location where services are delivered.

46 Claims, 10 Drawing Sheets

SYSTEM AND METHOD FOR CREDENTIAL MANAGEMENT AND ADMINISTRATION

REFERENCE TO RELATED APPLICATIONS

This application is a continuation-in-part of co-pending patent application Ser. No. 13/196,342 filed by Alan Amron on Aug. 2, 2011 and entitled SYSTEM AND METHOD FOR ALLOCATING ACCESS AT EVENTS.

BACKGROUND OF THE INVENTION

1. Field of the Invention

The present invention relates to systems and techniques for administering the credentials of those individuals who are authorized, for example, to receive or benefit from a product or service, to enter an area of restricted access, to be present at an event or performance, or to collect governmental benefit, so that individuals bearing such credentials may be easily, accurately and consistently distinguished from individuals who are not so authorized.

2. Discussion of the Background Art

There are many situations where it is necessary to distinguish between those individuals with and without authorization to perform a particular act. Representative examples of such acts include entering into a restricted-access building or area of a building, attending a sporting event or performance, and receiving or collecting a governmental benefit (or, for that matter, state-run lottery winnings). The complexity associated with conferring authority upon select individuals or groups of individuals correlates closely with the population of individuals included in the group(s), the degree to which that population is static or dynamic, the number of groups (if applicable) within the population, and the need to accommodate variations in authority among those groups. For example, in building security situations where the number of individuals to be recognized is relatively small, the turnover among them is low, and the security workforce stable, it is generally possible to rely solely on recognition of each individual based on their physical appearance (i.e., "by sight"). Where the number of individuals having authority to enter secure areas and/or facilities is too large or is subject to a higher rate of turnover, or where the security staff itself is subject to turnover, however, it is not feasible to rely upon recognizing individuals by sight alone.

It has therefore become commonplace to distribute wearable badges or wallet-sized identification cards and to uniquely associate each such badge or ID card with the individual wearing or carrying it. A typical badge or ID card, for example, may include a photograph, a signature, a fingerprint, an RFID tag, and usually some combination of these. Specially designed doors equipped to admit only one person at a time and only upon recognition of an appropriate code (whether by keypad entry, passive RFID detection, biometric scanning, etc.) are also commonplace.

While the aforementioned identification systems are now ubiquitous in the workplace, there are certain limitations which make them undesirable for certain situations such, for example, as where a higher degree of protection against counterfeiting is required or as where one or more groups of individuals have only a transient need to enter a specific building, facility, or area thereof. The need to safeguard against counterfeiting, of course, arises from the widespread availability of image scanners, color printers, and field-programmable RFID tags. While the need to prevent unauthorized duplication or counterfeiting of credentials is particularly acute when it comes to law enforcement and investigative personnel, additional safeguards would also be applicable to cards used to establish eligibility to receive government benefits (e.g., social security identification cards), to board an airplane as a passenger (e.g., a boarding pass), and even to collect lottery winnings As for transient or frequently changing access requirements, consider the examples of traveling sports teams and performers. A professional football team may play eighteen games, with half of these being at a local or "home" stadium and the other half of the games being "away games" played at the home stadium of an adversary. A professional baseball team may play almost ten times as many games as a football team, but with a similar distribution of local and away games. In each of these cases, there are team members, supporting staff and other employees that all require a way of documenting their authority to enter a stadium on the day of an event (whether it be a practice session, a pre-season game, a regular season game, or a post season game). A musician or band may play at a large number of venues during a single tour, while a movie or television show may require filming at a number of different locations, with a concert or filming session at each discrete location also constituting an "event".

In the aforementioned transient access situations, it has been customary to issue individuals who are authorized to be present at an event—whether they are attending as a member of the audience or in a supporting capacity—a discrete, temporary printed admission pass good only for the day of the event, after which it is to be discarded and cannot be used for admission to a subsequent event. These printed passes are expensive to produce, and each must be distributed to every authorized individual at some point prior to the applicable event(s). As the number of individuals with a need or desire to be present at multiple events grows, the cost and inefficiency of the approach quickly becomes apparent. While it would be possible to print and distribute a multiple use pass, the risk of unauthorized duplication and/or use, already quite high, increases dramatically.

In U.S. patent application Ser. No. 13/196,342 , the inventor herein proposed a credential management system which obviates the need to design, produce and distribute one-time printed passes to individuals authorized to be present at an event such, for example, as cast members, stage crew, security details and staff, important guests, performers, players, officials and many others.

A continuing need exists for credential management systems which minimize the risks of unauthorized use or duplication of distributed credentials, passes, badges and tickets.

A further need exists for credential management systems having an optional location tracking capability whereby the whereabouts of each person to whom a credential is issued can be remotely monitored during an event.

Yet another need exists for credential management systems which can be centrally administered to accommodate levels of authorization among individuals in a single group, among individuals in plural groups associated with a single entity (e.g. a corporate client or government organization), and even among respective groups and individuals associated with a plurality of such entities.

SUMMARY OF THE INVENTION

The aforementioned needs are addressed, and an advance is made in the art, by methods of configuring and administering secure electronic devices so that they visually present an authenticating credential, pass, badge, ticket, etc. An illustrative method according to the invention includes the step of associating each of a plurality of portable electronic devices with a corresponding user, utilizing an identifier that is unique to each device. The electronic devices can be smartphones, tablet computers, personal digital assistants (PDAs) adapted to utilize the services of a wireless telecommunications carrier and/or a wireless local area network (WLAN), they may be special purpose devices adapted for WLAN or physical link connections only, or they may be some combination of any or all of these devices. Non-limiting examples of useful unique identifiers include an internet protocol (IP) address, Ethernet media access control (MAC) address, a telephone number, an IMEI (International Mobile Equipment Identity) number, or an RFID tag.

The illustrative process further includes obtaining—for each of a group of secure electronic devices to be administered as a credential, pass, badge, ticket, permit or the like (collectively, "credentials")—visual symbol information from which a unique visual symbol to be displayed during a first time interval can be derived. The visual symbol information can include a bar code, an alphanumeric sequence, or other type of machine-discernable image. The obtained visual symbol information is transmitted or otherwise supplied to a corresponding device and, for the duration of the first time interval, each administered electronic device of a group displays a visual symbol that is not displayed by any other administered electronic device of that group.

The illustrative process further includes obtaining and transmitting, for each of the group of electronic devices to be administered as a credential, visual symbol information from which the next unique credential to be displayed during the next time interval by each device can be derived. The time intervals may be of equal duration, on the order of 30 to 6000 seconds depending upon the rate at which each credential is to be updated, or the duration may be randomly selected so as to change from one interval to the next.

In accordance with another aspect of an illustrative embodiment of the present invention, a process of facilitating authentication of a candidate portable electronic device displaying a visual symbol and presented as a credential comprises determining, in a first determining step, whether the candidate portable electronic device is identifiable by a unique ID associated with an authorized user. In a second determining step, a determination is made as to whether the visual symbol displayed by the candidate portable electronic device corresponds to a visual symbol valid for an authorized user during a current time interval.

If a candidate portable electronic device is identifiable by a unique ID associated with an administered user and received data is representative of a visual symbol valid during a current time interval, a record associated with administered user is updated to reflect at least one of the time, date, location and event where the first portable electronic device was presented as a credential. Thereafter, an acceptance decision may be transmitted to a remote terminal accessible by personnel to whom the candidate portable electronic device was presented. Optionally, an acceptance decision may also be transmitted to the remote terminal if the received data is representative of a visual symbol valid during a preceding time interval.

Conversely, if the candidate portable electronic device is not identifiable by a unique ID associated with an authorized user or if received data is not representative of a visual symbol valid during a current (or, optionally, a preceding) time interval and associated with any authorized user, a rejection decision is communicated to a remote terminal accessible by personnel to whom the candidate portable electronic device was presented.

In accordance with another aspect of illustrative embodiments of the present invention, at least some of the portable electronic devices include a global positioning satellite (GPS) receiver operative to obtain positional data and a corresponding cellular network transceiver for establishing a telecommunications link with a cellular network to thereby transmit position data for monitoring a location within a facility to which the first user has gained access using the first portable electronic device as a credential. Illustrative methods of administering such devices include a step of storing a record of locations visited by users of such devices while such users are present at a facility and a step of generating a report graphically presenting an average time spent, at respectively specified locations within the facility.

Alternate processes of administering devices may include steps of associating, in a database, each of a plurality of users with a corresponding portable electronic device having a memory, a display, at least one of a wireless transceiver and a global positioning satellite (GPS) receiver wherein each device is identifiable by a unique identifier, transmitting to each of said portable electronic devices an instruction to display at least one of a corporate logo, a respectively unique computer-readable visual symbol, and a personal photo for use as a credential to be presented at a facility; and collecting, from each device, data corresponding to time spent at a plurality of specified locations within a facility and to which each respective user has gained access using a corresponding portable electronic device as a credential. The collecting step may comprise receiving, at regular intervals, location data reported wirelessly by at least some of said portable electronic devices. Alternatively, the collecting step comprises performing wireless signal triangulation, at regular intervals, to locate at least some of said portable electronic devices. As yet another alternative, the collecting step may comprise downloading historical location data from at least some of the portable electronic devices via a physical link. The various reports may optionally incorporate socio-demographic information such that the movements of specific socio-demographic groups attending a particular event or visiting a given facility can be separately averaged and reported.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a schematic representation of the elements of a credential management system constructed in accordance with an illustrative embodiment of the present invention, the system including a back-end credential management server and a credential application download service for configuring to use conventional communication network links to update a plurality of distributed, portable electronic credentials, passes, badges, tickets, permits, licenses and the like;

Like reference numerals indicate like elements in the drawings. Unless otherwise indicated, elements are not drawn to scale.

DETAILED DESCRIPTION

Figure 1:
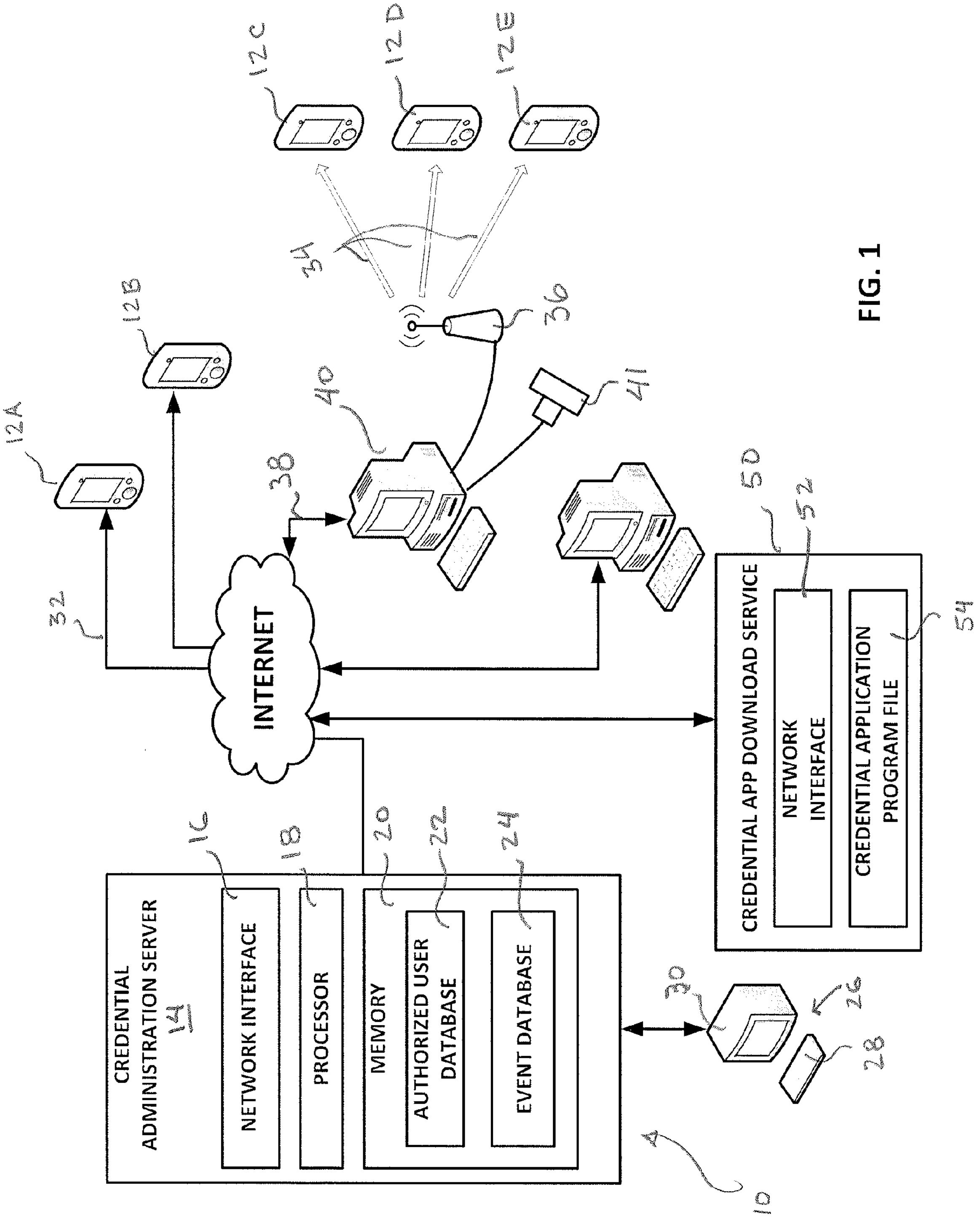

With initial reference to FIG. 1, there is shown an illustrative credential management system 10 for configuring a plurality of portable, secure electronic display devices indicated generally at 12A, 12B, 12C, 12D, and 12E, respectively. A characterizing feature of each of the devices 12A-12E depicted in FIG. 1 is the incorporation of a display dimensioned and arranged to present a visual symbol such that the device may serve as a secure electronic credential, pass, badge, ticket, permit, or license. As used herein, the phrase "visual symbol" is intended to encompass machine readable bar codes (e.g. UPC codes), alphanumeric sequences (which may consist of number sequences, letter sequences, or a combination thereof), images, and any other distinctive visible indicia apparent to a human observer and/or an optical scanning device. The term "credential" is intended to refer to a credential, badge, permit, license, and/or ticket as well as any combination of these.

Devices 12A-12E are dimensioned and arranged so that they can be carried, worn or otherwise presented—when depicting a visual symbol in accordance with the teachings of the present invention—as evidence, for example, of a person's authorization to be present at a particular facility or event (e.g., equivalent to an ID card issued by an employer, as a single- or multiple-event entry pass issued to staff, performers, members of the press, etc.), to receive a benefit (e.g., as a replacement for a social security card, health insurance card, other traditional indicia of entitlement), to exercise a governmentally regulated right or privilege (e.g., a license or permit credential), or to access the services of a common carrier (e.g., functioning as an airline boarding pass).

In any event, and with continued reference to FIG. 1, it will be appreciated that credential management system 10 includes a credential administration server 14 having a network interface 16, a processor 18, and memory 20. For a purpose which will be explained shortly, memory 20 defines an authorized user database indicated generally at reference number 22 and an event database indicated generally at reference numeral 24. Administrator input is supplied to credential administration server 14 by administrator terminal 26, which includes a keyboard 28, a display monitor 30, and other peripheral devices such as a mouse, scanning device, and printer (none of which are shown).

Interaction between credential management server 14 and electronic display devices 12A-12E is facilitated via a suitable network communication link as, for example, an internet link, established between network interface 16 and a corresponding interfaces and transceiver (not shown) within each respective electronic display device. In the latter regard, it should be emphasized that a credential management system constructed in accordance with the teachings of the present invention may be readily adapted to support a wide variety of electronic display devices. By way of illustrative example, and with continued reference to FIG. 1, display device 12A may be configured as a conventional smartphone device characterized by a processor, a memory containing operating software as well as executable software applications, a GPS receiver, a display, an alphanumeric input and/or touchscreen, and a wireless transceiver for interacting with the base station of a cellular network to set up a link 32 over which an internet connection to network interface 16 of administration server 14. Display device 12B, on the other hand, may be configured as a computer tablet device supported by a cellular carrier and equipped with the same generic components as a smartphone.

Devices 12C, 12D and 12E can, but need not be, configured as smartphone or table computer devices supported by a cellular carrier network. In the illustrative configuration shown in FIG. 1, each of these devices is configured with a suitable wireless transceiver for utilizing a corresponding wireless local area network link 34 which may be, for example, an IEEE 802.11 RF link. In this regard, devices 12C-12E may be configured as special-purpose devices. In the present inventor's co-pending U.S. patent application Ser. No. 13/196,342 , the entire disclosure of which is expressly incorporated herein by reference, there are disclosed special purpose pass devices which further include a display, memory, power source, transceiver, an on/off slide switch for energizing and de-energizing the device, and optionally, a display screen select pushbutton for allowing the user to toggle between a first display screen, and one or more additional screens. In any event, via link 34, each devices as device 12C is capable of interacting with administrative server 14 via a link to the internet 38 established via base station 36 and associated local terminal 40.

In accordance with an optional aspect of the present invention, credential management system 10 further includes a credential application download server 50 which includes a network interface and a downloadable credential application program file 54. In a conventional manner, a portable electronic device as smartphone device 12A may access an online marketplace such, for example as the Google Apps Marketplace or the Apple® iStore, and download an executable program which, when executed by a device such as device 12A, allows administration server 14 to interact and update device 12A as a credential in accordance with the teachings of the present invention.

Where smartphone devices are employed as secure electronic credentials in accordance with the present invention, the executable software program is preferably configured to prompt the user to decide whether to accept or reject the call. If the call is accepted, the program suspends further display of the credential (including both the visible symbol and any accompanying graphics corresponding to a ticket, pass, permit, or license being represented) until the call terminates and then automatically resumes the display. To increase visibility of the credential for all visibility conditions, the brightness of the display is set at a relatively high level at all times unless and until overridden by the user. Special purpose embodiments of the display devices, on the other hand, may incorporate a high contrast electrophoretic display.

In any event, having now described the various components of an illustrative credential administration system constructed in accordance with the present invention, the administration and managing of portable electronic display devices using such a system will now be described in detail.

Figure 2:
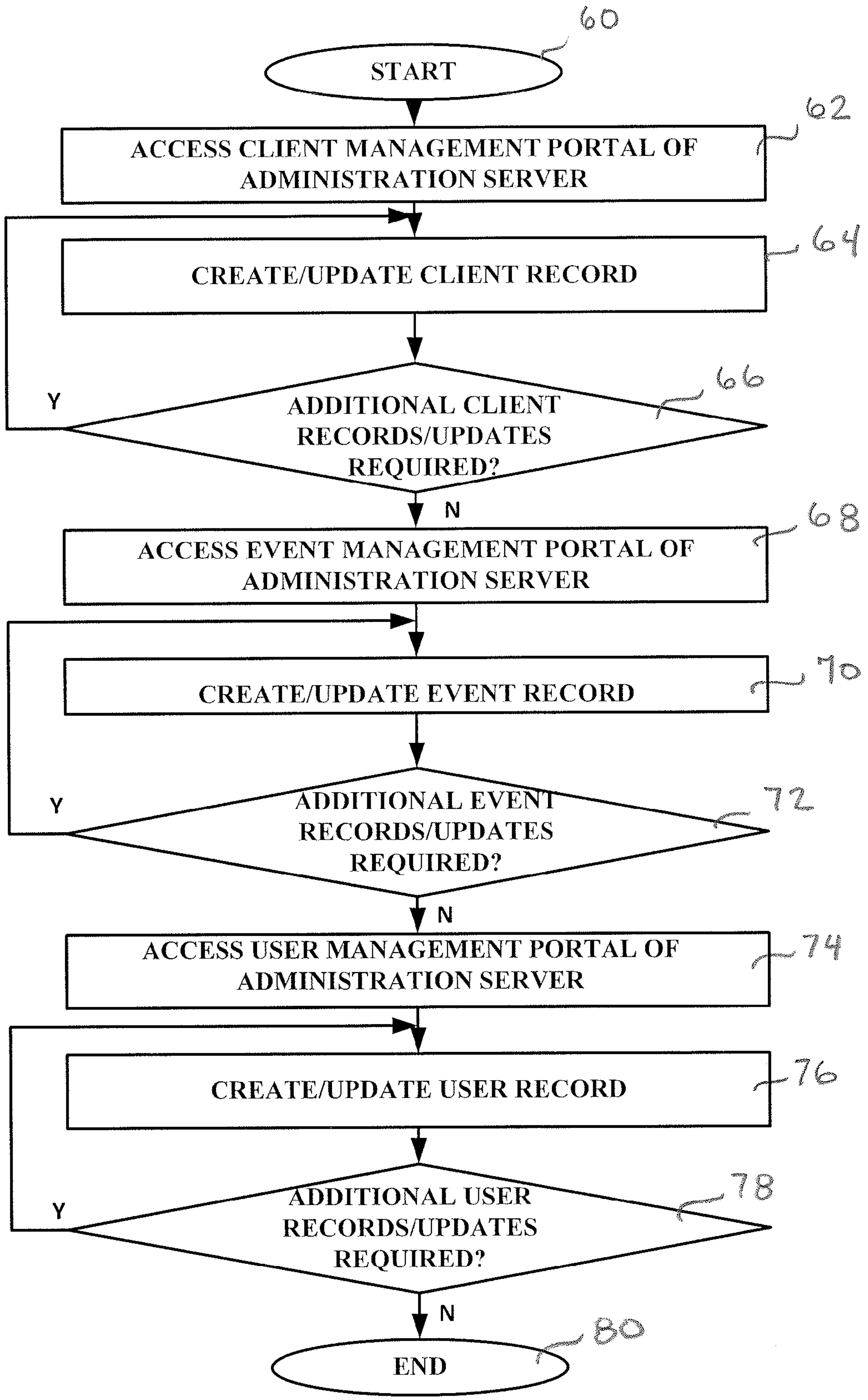
FIG. 2 is a flow chart depicting the client, event and user management processes of an exemplary back-end administrative process in accordance with an illustrative embodiment of the present invention.
Figure 3A:
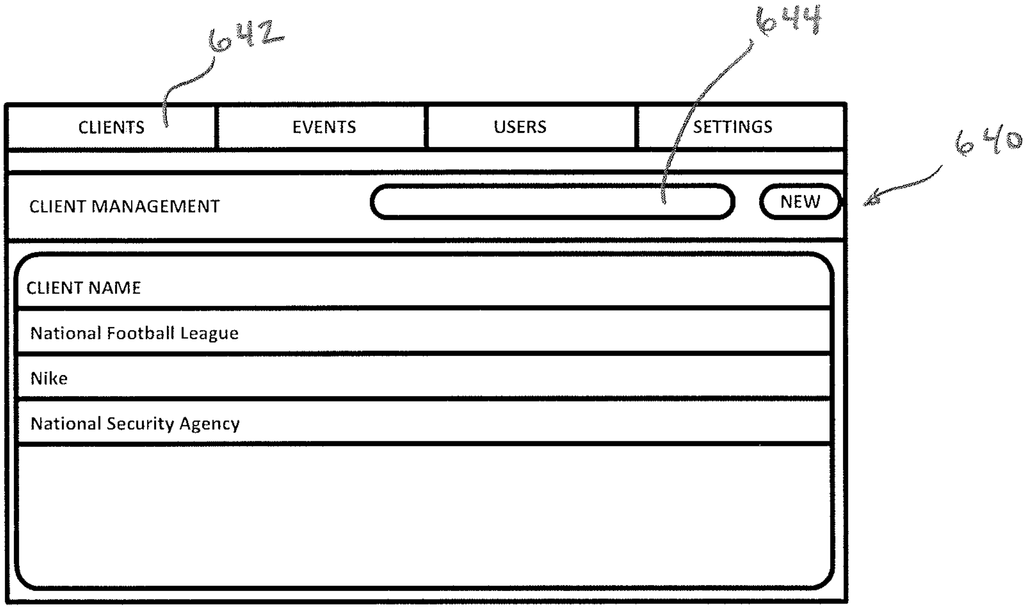
FIGS. 3A and 3B depict the user interface of an exemplary client management portal which may be utilized by an administrator to enter and update client information.
Figure 3B:
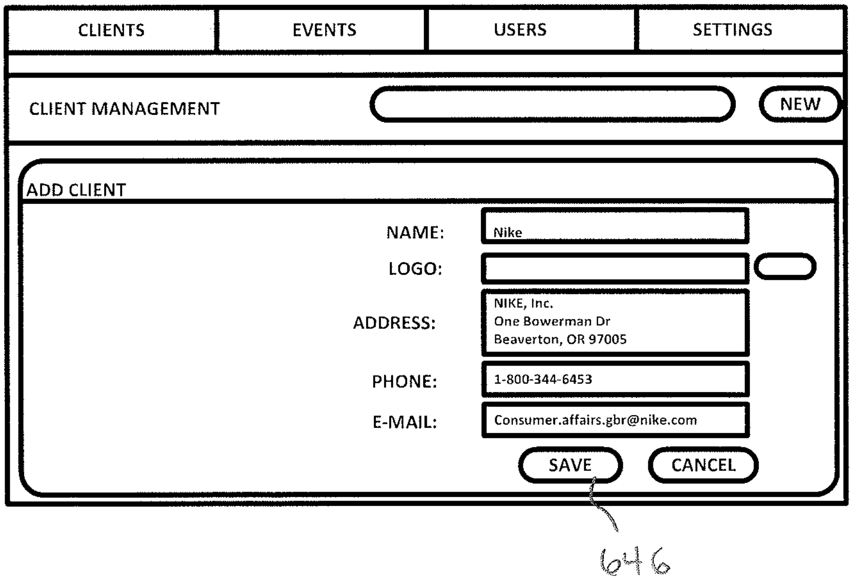

With reference now to FIG. 2, it will be seen that the process commences at block 60 and passes, at block 62, whereupon a client management portal of the administration server is accessed by the administrator. Using the client management portal, client records are either created or updated, via a series of input screens exemplified by FIGS. 3A and 3B. In the embodiment of FIGS. 2, 3A and 3B, it is contemplated that the credential administration needs of a plurality of client entities may be served by a single administration platform. In this regard, a single administration server as administration server 10 (FIG. 1) can support multiple categories of client organizations as well as multiple organizations in a single category. An example of the former would be a platform supporting law enforcement agencies, government benefit administration agencies, multinational corporations, professional sports organizations such as the National Football League (NFL). An example of the latter would be a platform supporting the site security needs of one or more multi-national corporations. It suffices to say that credential management systems constructed in accordance with the teachings of the present invention are scalable to accommodate the particular needs of the client application(s).

In any event, the process continues to block 64 at which point a client record is either created or updated. As shown in FIG. 3A, an administrator can access a first client management screen 640 to determine whether a particular client has already been set up in the system. This is performed by clicking on a “Clients” tab indicated generally at reference numeral 642, at which point a list of clients is presented to the administrator. Illustratively, the list of clients displayed can be narrowed as the administrator begins typing a part of the client’s name in client management field 644. In this case, typing the letter “N” causes the names of three pre-existing clients that have already set up in a client database. By clicking on one of the three entries, the administrator is presented with an opportunity to edit or add information for the selected client. As shown in FIG. 3B, each client record includes such data as the client name, file address for specifying a logo, the business address, the telephone number, and the e-mail address of the designated corporate contact. After entering any new data, the client file record is updated by clicking upon “save” button 646.

Figure 4A:
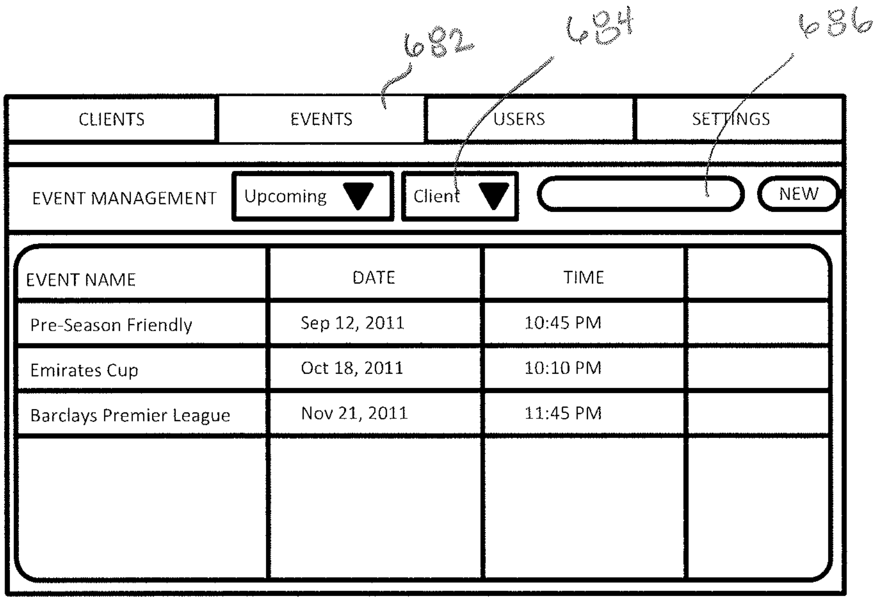
FIGS. 4A and 4B depict the user interface of an exemplary event management portal which may be utilized by an administrator to enter and update event information.
Figure 4B:
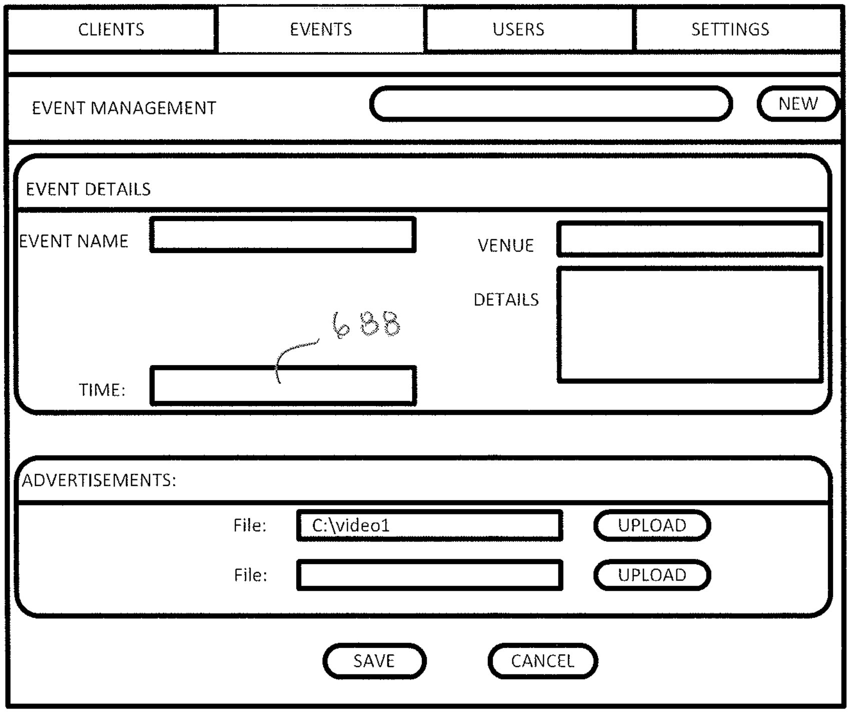

At decision block 66, a determination is made as to whether additional client records or updates are required. If so, the process returns to block 64, but if not the process proceeds to block 68. In the illustrative embodiment of FIGS. 2, 4A and 4B, a credential administration and management system is used to set up devices which will serve as credentials for entering an event such, for example, as football game or a concert, and for displaying indicia representative of the capacity in which the wearer or presenter of the device is serving (e.g., member of staff, press, performer etc.). Thus, as shown in block 68 of FIG. 2 and in FIGS. 4A and 4B, an administrator having clicked on the “Events” tab is presented with the opportunity to display upcoming events (events for which one or more entries already exist) and to either modify them, cancel them, or supplement them with additional events. The process advances to block 70 for creation of or updates to a particular event record. FIG. 4A depicts a listing of upcoming events, as well as the date and time for which these events are scheduled. By clicking on client tab 684, the administrator can associate a new event entry (entered in field 686) with a particular client. The various details to be entered for each event are shown FIG. 4B. The start and end times for the event, for example, are entered via field 688. In embodiments of the present invention in which the devices distributed to users are instructed to display a sequence of visual symbols for the duration of an event, reference may be made to the entered start and end time data.

Figure 5A:
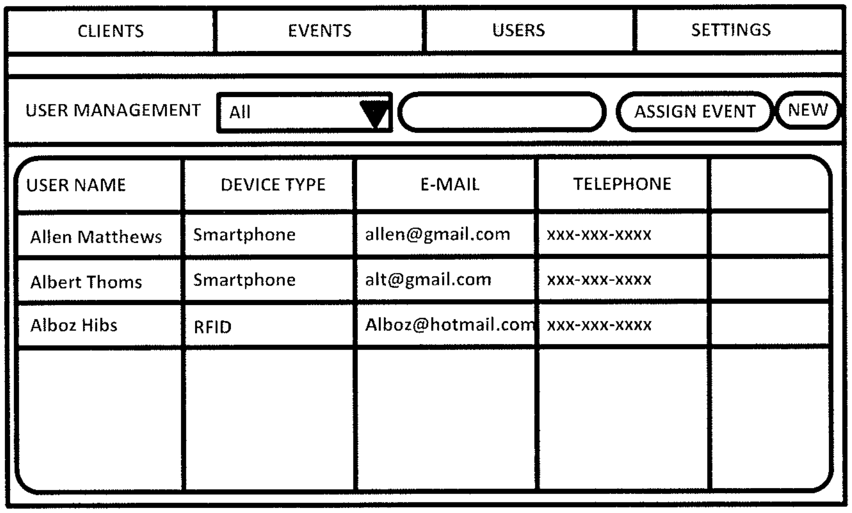
FIGS. 5A-5D depict the user interface of an exemplary user management portal which may be utilized by an administrator to enter and update client information.
Figure 5B:
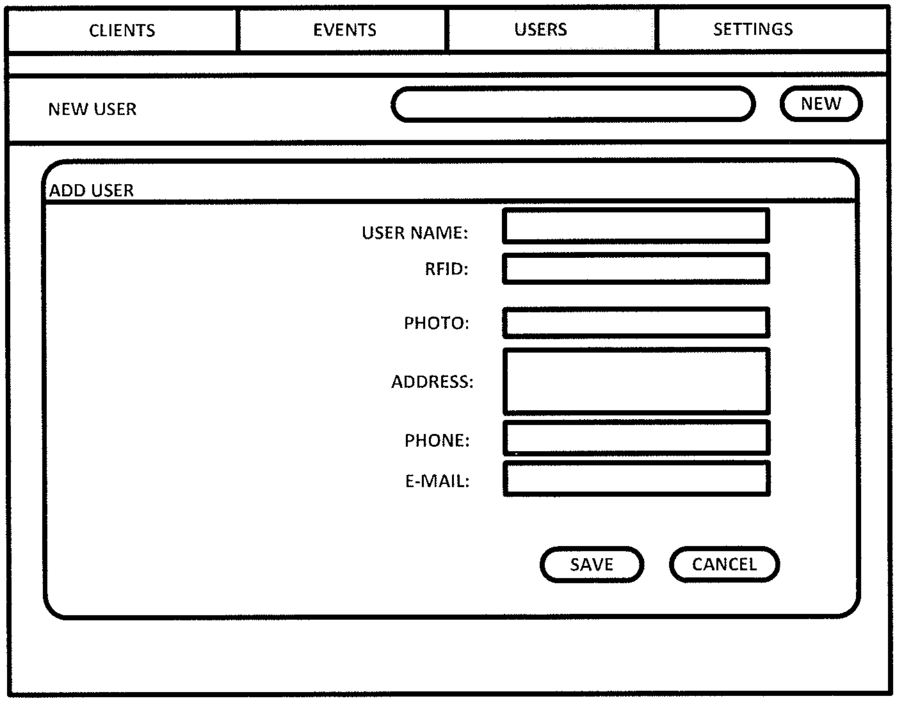
Figure 5C:
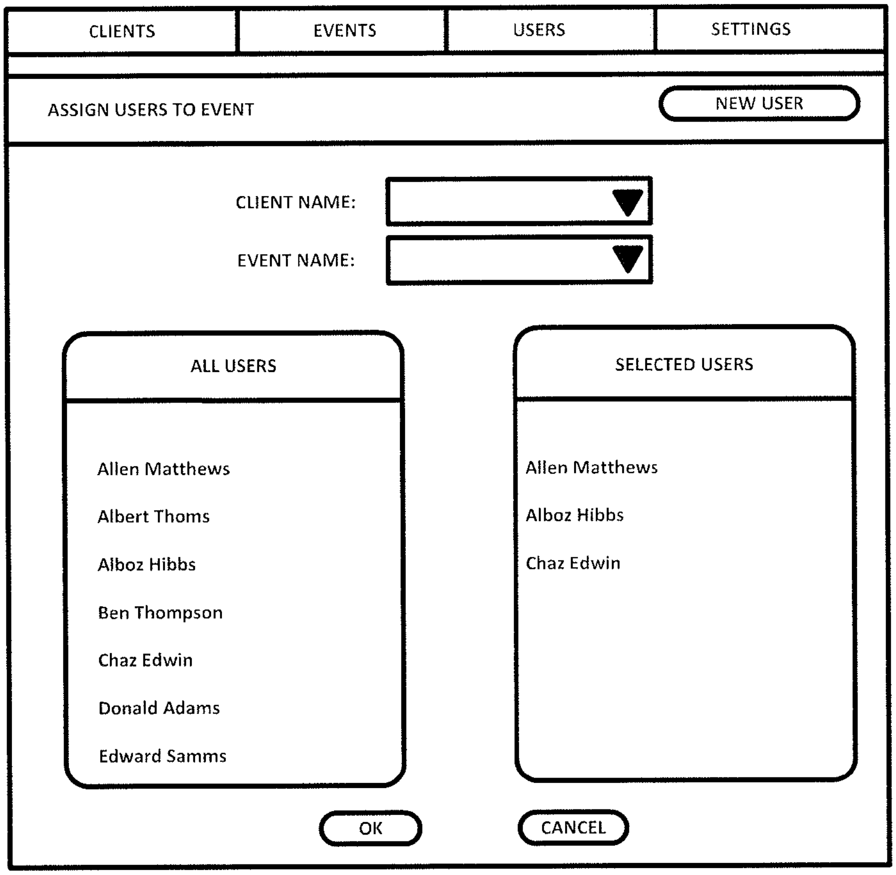
Figure 5D:
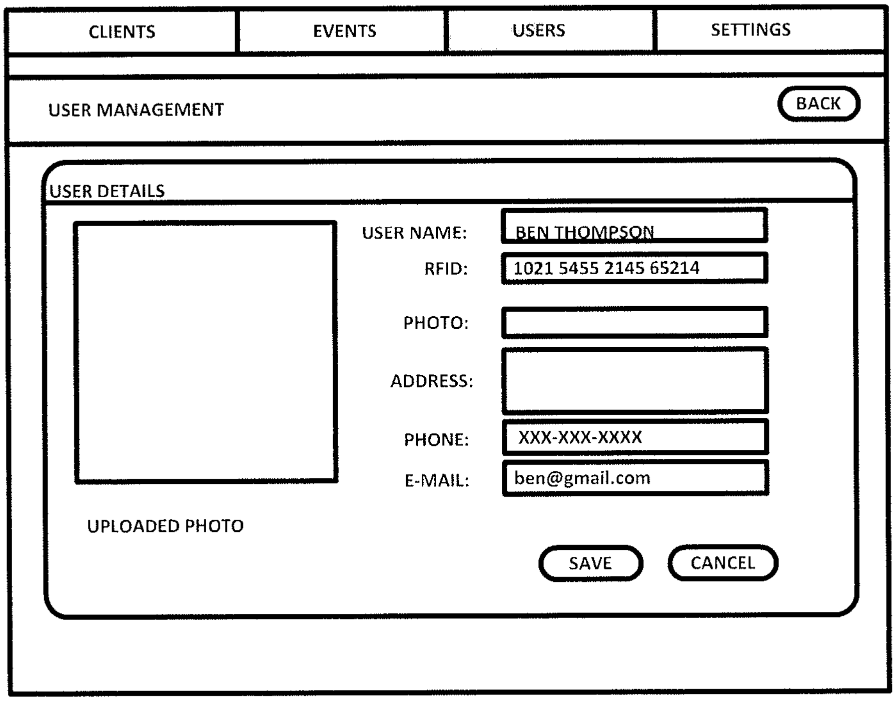

Returning to FIG. 2, it will be seen that at decision block 72, if there are further event records to be created or updated, the process returns to block 70, but if not then the process advances to block 74. At block 74, the user management portal of the credential administration server is accessed and, at block 76, a user record is created or updated. In this regard, it is understood that a user is the person on whose behalf a portable credential management device is to be administered and updated in accordance with the present invention. To this end, an association is created, in authorized user database 22 (FIG. 1), between unique identifiers (as, for example, the IP address, telephone number, mobile electronic serial number or ESN, or an RFID) and corresponding portable electronic display devices. As best seen in FIG. 5A, a typical entry for a particular authorized user may include the user’s name, the type of display device assigned to or owned by the user, an email address for the user, and a telephone number associated with the user or with the display device itself (in the case of smartphones and the like). FIG. 5B depicts the screen accessed by the administrator to add a new user, while FIG. 5C depicts the screen used by the administrator to assign users to a specific event and/or client. Finally, FIG. 5D is a screen which allows the user to see, at a glance, the entirety of a given user’s record.

In a manner which will soon be described, during an event or for a specified time period, a series of visual symbols are chosen and “pushed” to respective portable display devices. During a given time interval, each portable display device of a group of devices (for example, a plurality of devices associated with a given client or group of clients) are assigned a unique visual symbol. For example, for a given scheduled event, no two portable electronic display devices are sent the same visual symbol for display as a credential. As part of each user’s record, the most recent visual symbol pushed to the corresponding display device is stored and, optionally, the immediately preceding visible symbol (or symbols) may also be stored. In addition to the visual symbol, other data and images may be pushed by credential management and administration system 10 (FIG. 1) to each portable electronic display device. Images files corresponding to the respective visual components making up an identification card, entry pass, license, and so on, for example, can be sent to each device with an instruction to display any combination of the foregoing. By updating this information at periodic, finite, intervals, it is possible to create a secure and unique “document” which is not readily subject to forgery or duplication.

Figure 6:
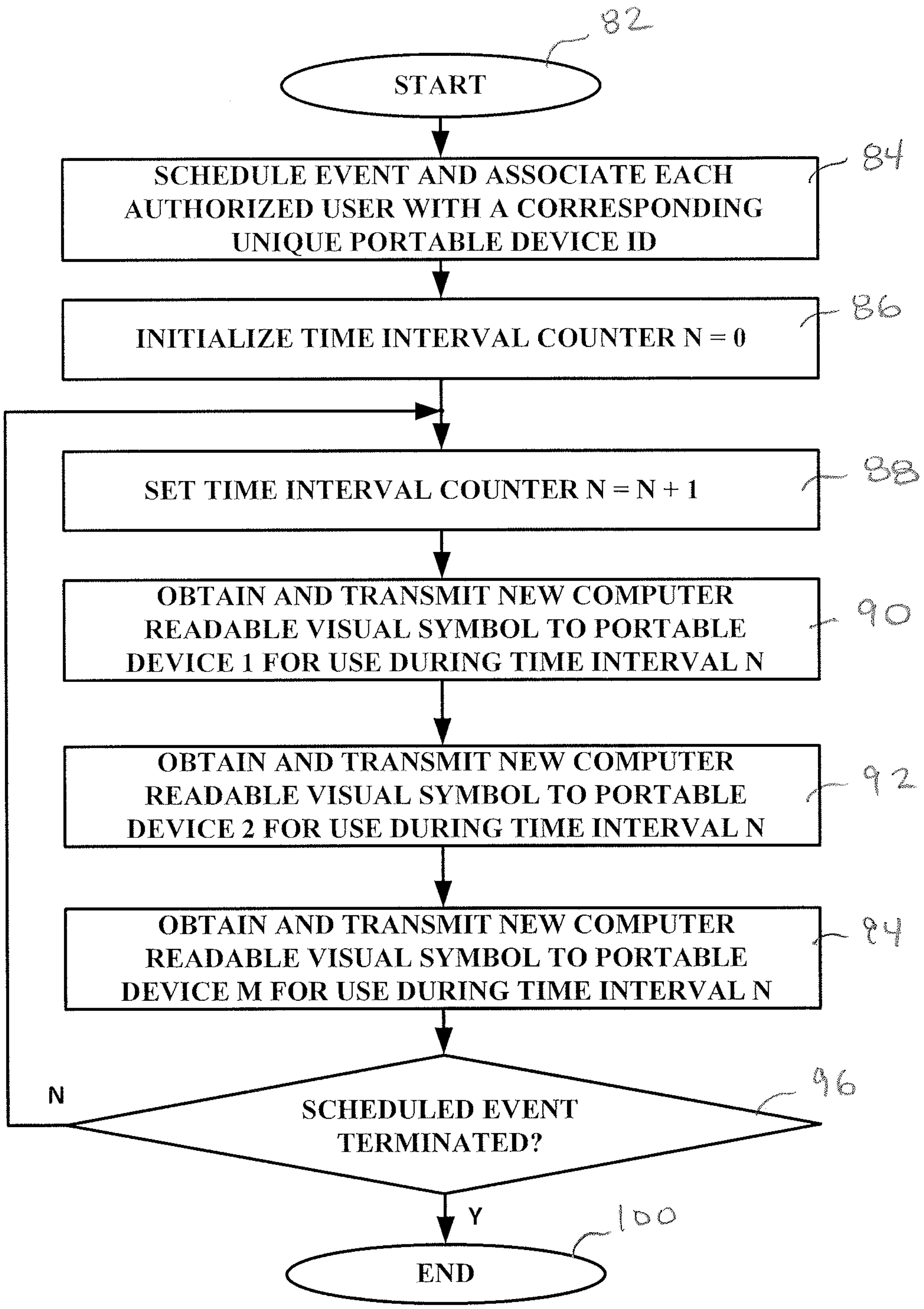
FIG. 6 is a flow chart depicting an illustrative sequence of updating the respectively unique, computer readable visual symbols displayed by corresponding portable electronic credential devices so that they display a unique symbol during each of a plurality of consecutive time intervals spanning an event.

The aforementioned capabilities are exemplified by FIG. 6 wherein it will be seen that a process of periodically pushing credential updates to a portable electronic device commences at start block 82 and then advances to block 84 wherein an administrator operates the system to schedule an event and to associate a user with a corresponding, unique portable device identifier (ID). At block 86, a time interval counter N is initialized and set to zero. While each time interval might, for example, be on the order of five to ten minutes, intervals of up to one hundred hours or more are possible. The principal advantage to intervals of shorter duration is that may provide a greater disincentive to would-be duplicators. It should also be mentioned that there is no requirement that the time intervals be of constant duration. Thus for example, each time interval may be randomly selected so as to be shorter or longer than the one which preceded it.

In any event and with continued reference to FIG. 6, it will be seen that the process then advances to block 88 wherein the interval counter is advanced by one, and thereafter to block 90 at which time credential management system 10 obtains and transmits the next visual symbol to be displayed by a particular portable display device (e.g., device 1). The same visual symbol obtaining and transmitting step is performed for devices 2 through M as exemplified by blocks 92 and 94. At decision block 96, a decision is made as to whether the event is still ongoing at the expiration of the first time interval, and if so, the process returns to block 88 and the interval counter N increments by one so that the steps (90-94) or updating display devices 1-M with respectively new visual symbols can be repeated. If it is determined that the event has terminated, on the other hand, the process ends at block 100.

Figure 7:
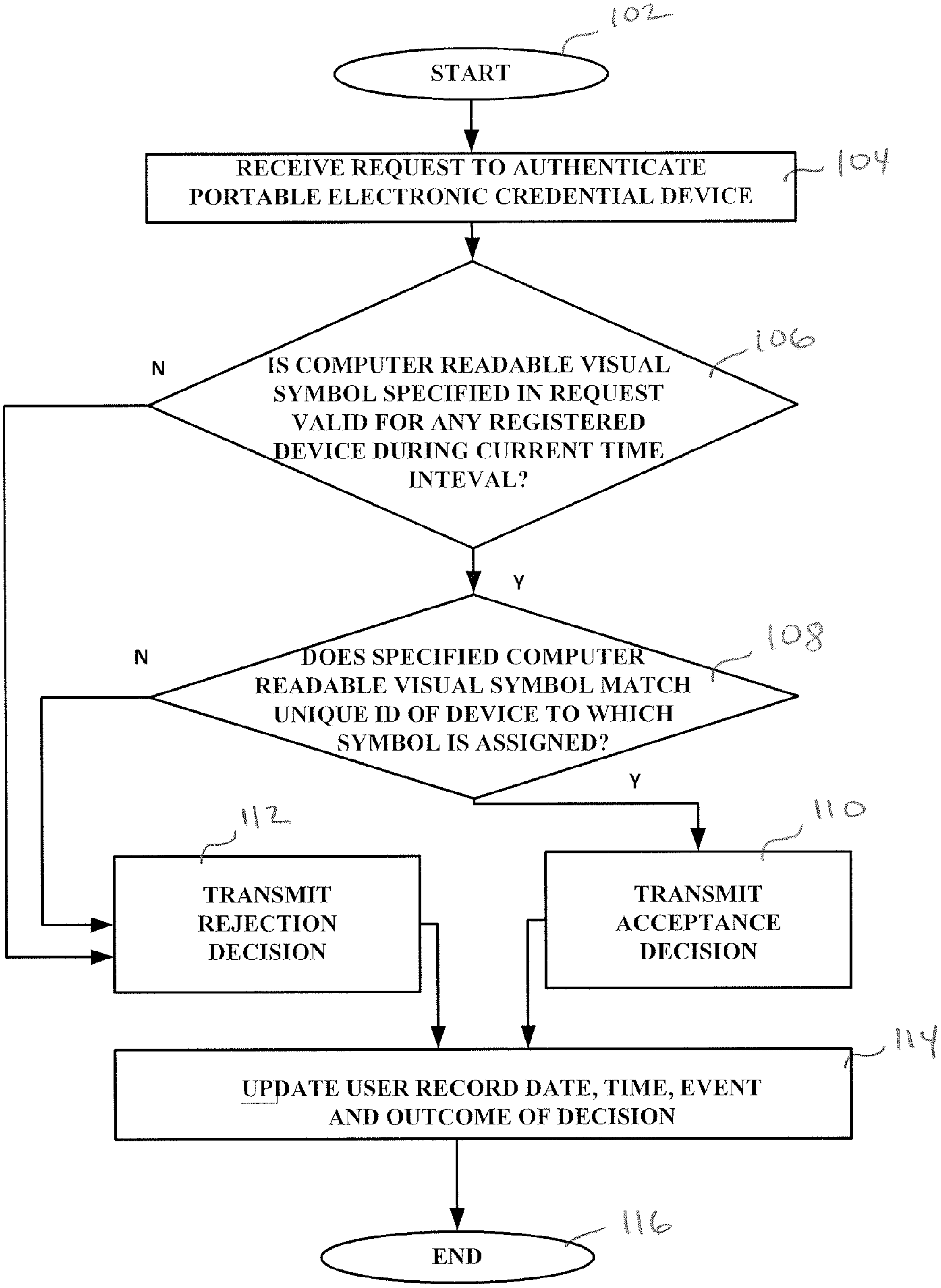
FIG. 7 is a flow chart depicting an illustrative process of portable credential device authentication, which may be optionally performed at the credential administration server.

Turning now to FIG. 7, it will be seen that a process of facilitating authentication of portable electronic devices presented as credentials in accordance with an aspect of the present invention commences at block 102 and advances to block 104 wherein a request is received to authenticate a portable electronic credential device. By way of illustrative example and with momentary reference to FIG. 1, the authentication process may be initiated when a visual symbol displayed by a portable electronic display device as device 12A is scanned (e.g., by security staff) by a conventional bar code scanner indicated generally at reference numeral 41 and associated with remote terminal 40. Alternatively, a passive RFID scanner may detect the presence of a portable electronic display device and trigger an authentication request via remote terminal 40. At decision block 106, an initial decision is made as to whether the visual symbol specified in a request is valid during the current time interval for any of the devices managed by the credential management and administration system, or whether it has already been used to gain access to the event. If the symbol is not valid or has already been used, a rejection decision is transmitted to the requesting terminal (block 112), a record of the attempt is made, and the process ends at block 116. If the reason for the rejection was due to prior use of the same visual symbol by a different device, this reason is transmitted as part of the rejection decision notification. Likewise, if visual symbol was not valid, then this information is returned as part of the rejection decision.

If, on the other hand, it is determined at block 106 that the visual symbol is valid for any administered display device (i.e., one for which a user or unique ID entry exists in the system), then the process advances to decision block 108. At decision block 108, a determination is made as to whether the visual symbol presented during the authentication request matches the unique device id and/or user to which it is assigned in the records of authorized user database 22 (FIG. 1). If the outcome is no, the process proceeds to blocks 112, 114, and 116 as described previously. However, if the outcome is yes, an acceptance decision is transmitted (block 110), the process advances to block 114 where in the client/user/event records are updated accordingly, and then the process terminates at block 116.

Figure 8:
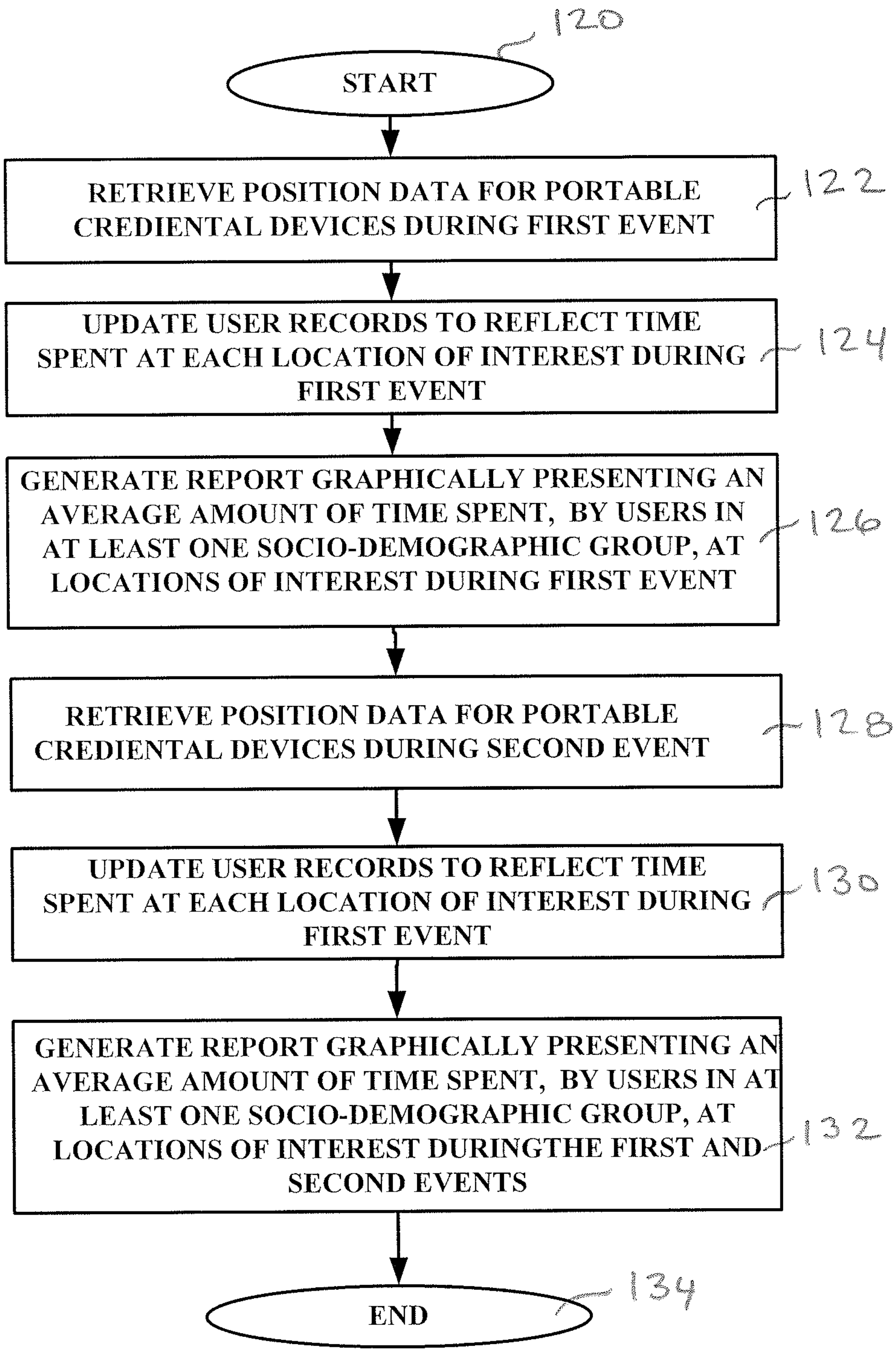
FIG. 8 is a flow chart depicting an illustrative process for generating reports of interest to an event sponsor or other client, utilizing socio-demographic data entered by the administrator for at least some users as well as location data made available via wireless triangulation, gps tracking or other suitable means.

FIG. 8 depicts a process of operating a credential management and administration server to update user records using user location/mobility data. The location data can take the form of either obtaining location data directly from devices such as devices 12A-12E (FIG. 1) (as might be obtained when the devices are equipped with GPS receivers) or by remote fixing using transmission signal triangulation or other conventional means. In any event, the process is entered at block 120 and advances to block 122, whereupon the position data is retrieved for portable credential devices during, for example, an event or within a specified time range during which devices as devices 12A-12E are being used as credentials in accordance with the present invention. The process then advances to block 124 whereupon the user records are updated to reflect time spent at each of a plurality of locations of interest specified by the administrator (and, in turn, by the client).

By way of illustrative example, a client may be interest in knowing how much time users spend waiting at line at specific locations (snack bar, souvenir shop, benefits window) or how long a staff member spent at a particular part of a building. To facilitate detailed reports which include such socio-demographic data as household income, gender, marital status and the like, the administrator may additionally include such information as part of each user's data record. To this end, at block 126 a report is generated which graphically presents an average amount of time spent, by users in at least one socio-demographic group, at locations of interest. This may be during a specific event or within a specific date range, as the case may be. It is further possible to collect user location data during additional events or over specific blocks of time (block 128) and updating the user records with the additional data (block 130) so that reports aggregating data from multiple events or dates/times can be generated (block 132). When all desired data entry and/or reporting activity is completed, the process terminates at block 134.

Figure 9:
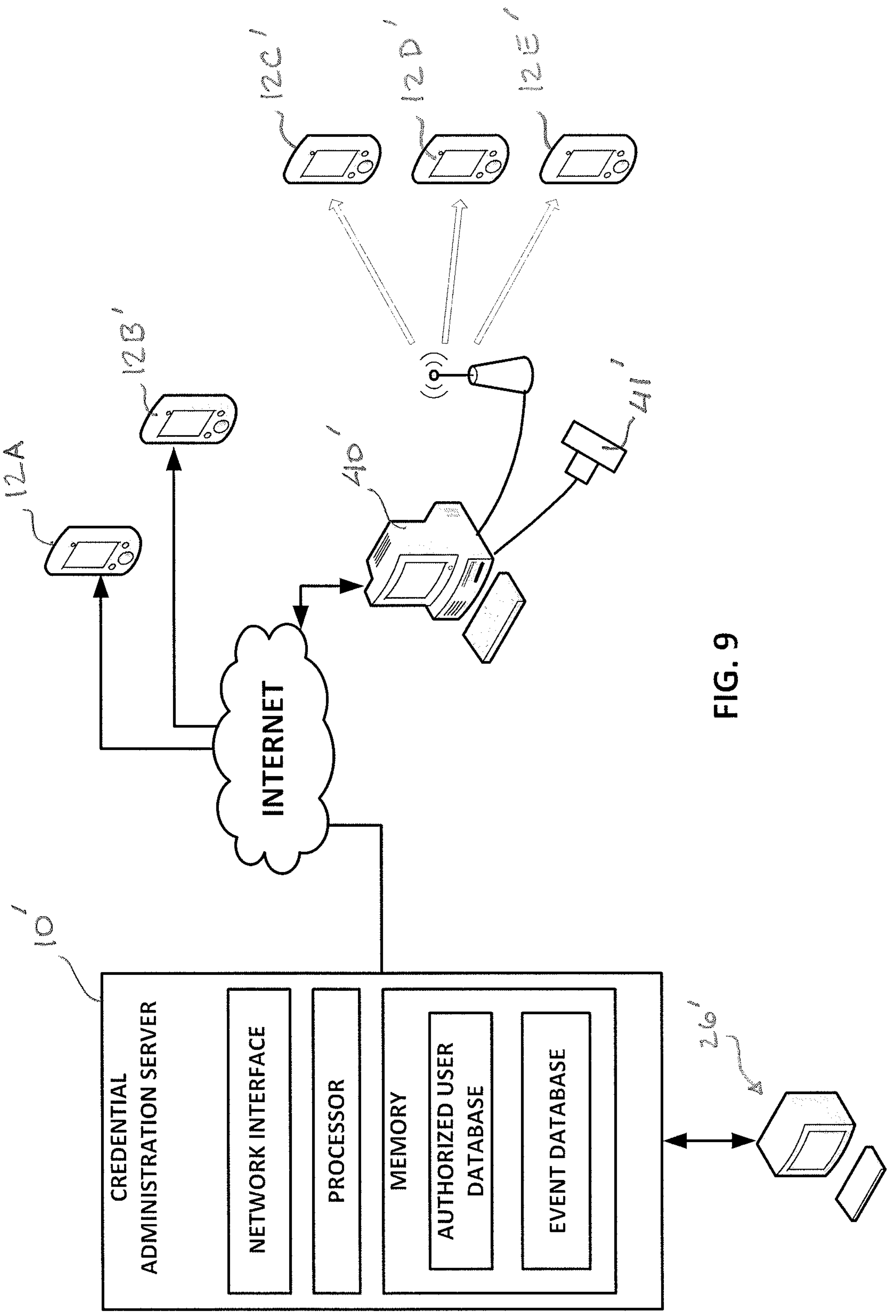
FIG. 9 is a modified system in which an credential administration server constructed in accordance with the present invention is used to manage and update the credentials presented by a plurality of special purpose, portable electronic devices (as opposed to smart phones, pda's and tablet computers).

In FIG. 9 there is shown a modified embodiment of the configuration management system depicted in FIG. 1, wherein like elements are identified by like numerals. In the embodiment of FIG. 9, the portable electronic display devices as devices 12A'-12E' are pre-configured with the program for executing the program which enables them to be administered by system 10'.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non transitory computer-readable storage medium encoded with computer-executable instructions which, when executed by a processor, perform a method for configuring a portable electronic device as part of a credential management system, comprising:

associating at a credential administration server, a first portable electronic device, identifiable by a unique identifier, with a first user and at least one of a location or a service subject to access restrictions;

obtaining first visual symbol information, at the credential administration server, for use by the first portable electronic device in iniating display of a first machine discernable image to be presented as an access credential by the first user during a first specified time interval, the first time interval being specified to have a duration of between 30 to 6000 seconds;

for visible display of the first machine discernable image by the first portable device during the first time interval, initiating wireless transmission of the obtained first visual symbol information to the first portable electronic device;

obtaining second visual symbol information, at the credential administration server, for use by the first portable electronic device in initiating display of a second machine discernable image to be presented as an access credential by the first user during a second specified time interval, the second time interval being specified to have a duration of between 30 to 6000 seconds; and for visible display of the second machine discernable image by the first portable electronic device upon expiration of the first time interval, initiating wireless transmission of the obtained second visual symbol information to the first portable electronic device.

2. The computer-readable storage medium according to claim 1, wherein computer instructions stored therein, when executed by a processor, further perform a step of associating, at the credential administration server, the first visual symbol information with the first user during the first time interval.

3. The computer-readable storage medium according to claim 2, wherein computer instructions stored therein, when executed by a processor, further perform a step of associating, at the credential admininistration server, the second visual symbol information with the first user during the second time interval.

4. The computer-readable storage medium according to claim 3, wherein computer instructions stored therein, when executed by a processor, further perform a step of associating, at the credential administration server, the first visual symbol information with the first user during the second time interval, thereby facilitating authentication of the first user if the second visual symbol information is not received by the first portable electronic device.

5. The computer-readable storage medium according to claim 1, wherein computer instructions stored therein, when executed by a processor, specify that the first time interval and the second time interval are of equal duration.

6. The computer readable storage medium according to claim 1, wherein computer instructions stored therein, when executed by a processor, further perform a step of randomly selecting, at the credential administration server, the first and second time intervals such that they are of unequal duration.

7. The computer-readable storage medium according to claim 1, wherein the first portable electronic device includes a processor, a power source, and a display for visually reproducing the first and second machine discernable images.

8. The computer-readable storage medium according to claim 7, wherein computer instructions stored therein, when executed by a processor, further perform a step of transmitting a generation instruction to the first portable electronic device, the first portable electronic device being responsive to each generation instruction received to locally generate a corresponding bar code as the machine discernable image.

9. The computer-readable storage medium according to claim 1, wherein computer instructions stored therein, when executed by a processor, further perform receiving and storing, at the credential administration server, administrator input specifying at least one of an identity of an event to be attended by the first user, an event logo, an employer logo, an employer identification, first and last names of the first user, or areas of a facility to which the first user is authorized for entry during an event.

10. The computer-readable storage medium according to claim 9, wherein computer instructions stored therein, when executed by a processor, further perform transmitting, to the first portable device, information representative of at least one of an identity of an event to be attended by the first user, an event logo, an employer logo, an employer identification, first and last names of the first user, or areas of a facility to which the first user is authorized for entry during an event.

11. The computer readable storage medium according to claim 1, wherein the first portable electronic device is one of a smartphone, a tablet computer, a personal digital assistant, and a special purpose device having a display, memory and processor and wherein the unique identifier is one of an internet protocol (IP) address, a telephone number, an electronic serial number, and an RFID identifier.

12. The computer-readable storage medium according to claim 1, wherein computer instructions stored therein, when executed by a processor, further perform receiving from the first portable electronic device, information specifying at least one of the unique identifier, an event to be attended by the first user, and first and last names of the first user.

13. The computer-readable storage medium according to claim 7, wherein the first portable electronic device is one of a smartphone, a tablet computer, a personal digital assistant, and a special purpose device having a display, memory and processor and wherein the unique identifier is one of an internet protocol (IP) address, a telephone number, an electronic serial number, and an RFID identifier.

14. The computer-readable storage medium according to claim 1, wherein computer instructions stored therein, when executed by a processor, further perform associating at a credential administration server a second portable electronic device, identifiable by a unique identifier, with a second user and at least one of a location or a service subject to access restrictions;

obtaining third visual symbol information, at the credential administration server, for use by the second portable electronic device in initiating display of a third machine discernable image to be presented by the second user as an access credential during the first time interval;

for visible display of the third machine discernable image by the second portable device during the first time interval, initating wireless transmission of the obtained third visual symbol information to the second portable electronic device;

obtaining fourth visual symbol information, at the credential administration server, for use by the second portable electronic device in initiating display of a fourth machine discernable image to be presented by the second user as an access credential during the second time interval; and for visible display of the fourth machine discernable image by the second portable device commencing at expiration of the first time interval, initiating wireless transmission of the fourth visual symbol to the second portable electronic device.

15. The computer-readable storage medium according to claim 14, wherein computer instructions stored therein, when executed by a processor, further perform a step of associating, at the credential administration server, the third visual symbol information with the second user during the first time interval.

16. The computer-readable storage medium according to claim 15, wherein computer instructions stored therein, when executed by a processor, further perform a step of associating, at the credential administration server, the third visual symbol information and the fourth visual symbol information with the second user during the second time interval, thereby facilitating authentication of the second user during the second time interval in the event the fourth visual symbol information is not received by the second portable electronic device.

17. The computer-readable storage medium according to claim 14, wherein obtaining each of said first and said second visual symbol information includes generating first bar code information and second bar code information, respectively and wherein obtaining each of said third and said fourth visual symbol information includes generating third and fourth bar code information, respectively, thereby facilitating display of a respectively different bar code by each portable electronic device during each corresponding time interval.

18. The computer-readable storage medium according to claim 1, wherein obtaining each of said first and said second visual symbol information includes generating first bar code information and second bar code information, respectively, thereby facilitating display of a different bar code by the first portable electronic device during each corresponding time interval.

19. A method for configuring a plurality of portable electronic devices having a memory, a transceiver, and a display, using a credential management system, comprising:

associating at a credential administration server a first portable electronic device, identifiable by a unique identifier, with a first user and at least one of a location or a service subject to access restrictions;

obtaining first visual symbol information, at the credential administration server, for use by the first portable electronic device in initiating display of a first machine discernable image to be presented as an access credential by the first user during a first specified time interval, the first time interval being specified to have a duration of between 30 to 6000 seconds;

providing instructions executable by the first portable electronic device for causing display of the first machine discernable image by the first portable device during the first time interval;

wirelessly transmitting the first visual symbol information to the first portable electronic device;

obtaining second visual symbol information, at the credential administration server, for use by the first portable electronic device in initiating display of a second machine discernable image to be presented as an access credential by the first user during a second specified time interval, the second time interval being specified to have a duration of between 30 to 6000 seconds;

providing instructions executable by the first portable electronic device for causing display of the second machine discernable image by the first portable device during the second time interval commencing at expiration of the first time interval, and wirelessly transmitting the second visual symbol information to the first portable electronic device.

20. The method according to claim 19, further comprising a step of associating, at the credential administrative server, the first visual symbol information with the first user during the first time interval.

21. The method according to claim 20, further comprising a step of associating, at the credential administration server, the second visual symbol information with the first user during the second time interval.

22. The method according to claim 20, further comprising a step of associating, at the credential administration server, the first visual symbol information with the first user during the second time interval, thereby facilitating authentication of the first user during the second interval if the second computer-readable visual symbol is not received by the first portable electronic device.

23. The method according to claim 19, wherein the first time interval and the second time interval are of equal duration.

24. The method according to claim 19, further including a step of randomly selecting, at the credential administration server, each of the first and second time intervals such that they are of unequal duration.

25. The method according to claim 19, wherein each of the first and second visual symbols are bar codes, the method further including a step of initiating, from the credential administration server, transmission of a generation instruction to the first portable electronic device and the first portable electronic device being responsive to each generation instruction received to locally generate and display a corresponding bar code as the machine discernable image.

26. The method according to claim 19, further including a step of receiving and storing, at the credential administration server, administrator input specifying at least one of an identity of an event to be attended by the first user, an event logo, an employer logo, an employer identification, first and last names of the first user, or areas of a facility to which the first user is authorized for entry during an identified event.

27. The method according to claim 26, further including a step of transmitting, to the first portable device, information representative of at least one of an identity of an event to be attended by the first user, an event logo, an employer logo, an employer identification, first and last names of the first user, or areas of a facility to which the first user is authorized for entry during an identified event.

28. The method according to claim 26, wherein the first portable electronic device is one of a smartphone, a tablet computer, a personal digital assistant, and a special purpose device having a display, memory and processor and wherein the unique identifier is one of an internet protocol (IP) address, a telephone number, an electronic serial number, and an RFID identifier.

29. The method according to claim 28, further including a step of receiving from the first portable electronic device, information specifying at least one of the unique identifier, an event to be attended by the first user, and first and last names of the first user.

30. The method according to claim 19, wherein the first portable electronic device is one of a smartphone, a tablet computer, a personal digital assistant, and a special purpose device having a display, memory and processor and wherein the unique identifier is one of an internet protocol (IP) address, a telephone number, an electronic serial number, and an RFID identifier.

31. The method according to claim 19, further including:

associating at a credential administration server a second portable electronic device, identifiable by a unique identifier, with a second user and at least one of a location or a service subject to access restrictions;

obtaining third visual symbol information, at the credential administration server, for use by the second portable electronic device in initiating display of a third machine discernable image to be presented as an access credential by the second user during the first specified time interval;

providing instructions executable by the second portable electronic device for causing display of the third machine discernable image by the second portable device during the first time interval;

wirelessly transmitting the third visual symbol information to the second portable electronic device;

obtaining fourth visual symbol information, at the credential administration server, for use by the second portable electronic device in initiating display of a fourth machine discernable image to be presented as an access credential by the second user during the second specified time interval;

providing instructions executable by the second portable electronic device for causing display of the fourth machine discernable image by the second portable device during the second time interval commencing at expiration of the first time interval, and wirelessly transmitting the fourth visual symbol information to the second portable electronic device.

32. The method according to claim 31, further including a step of associating, at the credential administration server, the third visual symbol with the second user during the first time interval.

33. The method according to claim 32, further including a step of associating, at the credential administration server, the third visual symbol and the fourth visual symbol with the second user during the second time interval, thereby facilitating authentication of the second user during the second interval in the event the third visual symbol is not received by the second portable electronic device.

34. The method according to claim 31, further including a step of facilitating authentication of a candidate portable electronic device displaying a machine discernable image as a credential by determining, in a first determining step, whether the candidate portable electronic device is identifiable by a unique ID associated with an authorized user; and determining, in a second determining step, whether the machine discernable displayed by the candidate portable electronic device corresponds to a visual symbol valid for an authorized user during a current time interval.

35. The method according to claim 34, wherein if the candidate portable electronic device is identifiable by a unique ID associated with the first user and the received data is representative of a visual symbol valid during a current time interval, updating a record associated with the first user to reflect at least one of the time, date, location and event where the first portable electronic device was presented as a credential.

36. The method according to claim 35, further including a step of communicating an acceptance decision to a remote terminal accessible by personnel to whom the candidate portable electronic device was presented.

37. The method according to claim 34, wherein if the candidate portable electronic device is identifiable by a unique ID associated with the first user and the received data is representative of a visual symbol valid during a current time interval or an immediately preceding time interval associated with the first user, updating a record associated with the first user to reflect at least one of the time, date, location and event where the first portable electronic device was presented as a credential.

38. The method according to claim 34, wherein if the candidate portable electronic device is not identifiable by a unique ID associated with an authorized user or if the received data is not representative of a visual symbol valid during a current time interval and associated with any authorized user, communicating a rejection decision to a remote terminal accessible by personnel to whom the candidate portable electronic device was presented.

39. The method according to claim 19, wherein the first portable electronic device includes a global positioning satellite (GPS) receiver operative to obtain positional data and a corresponding cellular network transceiver for establishing a telecommunications link with a cellular network to thereby transmit position data for monitoring a location within a facility to which the first user has gained access using the first portable electronic device as a credential, said method further including a step of storing a record of locations visited by the first user while the first user is present at the facility.

40. The method according to claim 39, further including a step of generating a report graphically presenting an average time spent, at respectively specified locations within a facility, by users presenting a portable electronic device as a credential.

41. A method for configuring portable electronic devices each having a memory, a transceiver, and a display, using a credential management system, comprising:

obtaining first information corresponding to a first machine discernable image to be used by a first user during a specified first time interval of specified duration;

providing first instructions executable by a first portable electronic device associated with the first user for causing presentation of the first machine discernable image by the first portable device during the first time interval;

wirelessly transmitting the first information to the first portable electronic device;

obtaining second information corresponding to a second machine discernable image to be used by the first user during a second specified time interval of specified duration;

providing second instructions executable by the portable electronic device for automatically causing presentation of the second machine discernable image by the first portable device during the second time interval commencing at expiration of the first time interval;

wirelessly transmitting the second symbol information to the first portable electronic device; and transmitting over a communication network from a credential administrative server, data to be displayed by the first portable device during the first and second time intervals and together with each machine discernable image, the data including an assigned seating location, an event start time, an event date, and names of competing teams, or an identity of an issuing authority, or an identity of a transportation carrier, a departure date, a departure time, and a gate assignment;

whereby the first portable device is caused, by execution of the first instructions, to cease presenting the first machine discernable image at expiration of the first time interval, and whereby the first portable device is caused, by execution of the second instructions, to commence presenting the second machine discernable image, at initiation of the second time interval.

42. The method of claim 41, further including a step of updating data to be displayed by the first portable device by transmitting, from the credential administrative server, at least one of a changed seating assignment, a changed gate assignment, and a changed departure time.

43. The method of claim 42, further including a step of transmitting one of an e-mail and a text message to a user of the first portable device as notification of any transmission of updating data.

44. The method of claim 41, wherein each of the first and the second machine discernable image is a respective bar code displayed continuously during the first interval and the second interval, respectively.

45. The method of claim 41, further including a step of collecting, from each respective portable electronic device, data corresponding to time spent by a corresponding user at one or more locations within a facility and to which the corresponding user has gained access after using a corresponding portable electronic device as a credential to enter the facility.

46. The method of claim 45, further including a step of generating a report graphically presenting average time spent, by respective socio-demographic groups of users who presented a portable electronic device as a credential to gain access to an event, at the one or more specified locations.

* * * * *